United States Patent [19]

Schuh

[11] 4,438,542

[45] Mar. 27, 1984

[54] DISK STORAGE DRIVE

[75] Inventor: Bernard Schuh, St. Georgen, Fed. Rep. of Germany

[73] Assignee: Papst-Motoren GmbH & Co. KG, St. Georgen, Fed. Rep. of Germany

[21] Appl. No.: 353,584

[22] Filed: Mar. 1, 1982

Related U.S. Application Data

[63] Continuation-in-part of Ser. No. 127,404, Mar. 5, 1980, abandoned.

[51] Int. Cl.³ .......................................... G11B 5/012
[52] U.S. Cl. ...................................... 360/97; 360/102; 360/133; 318/138; 310/49 R
[58] Field of Search ...................... 360/97–99, 360/102–104, 133, 135; 310/49 R, 156, 254, 268; 318/138

[56] References Cited

U.S. PATENT DOCUMENTS

| | | | |
|---|---|---|---|
| 3,840,761 | 10/1974 | Muller | 310/49 R |
| 3,873,897 | 3/1975 | Muller | 318/254 A |
| 4,005,490 | 1/1977 | Duncan et al. | 360/97 |
| 4,101,945 | 7/1978 | Butsch | 360/102 |
| 4,150,406 | 4/1979 | Stollorz | 360/97 |
| 4,185,308 | 1/1980 | Fujioka | 360/97 |
| 4,216,512 | 8/1980 | Vidwans | 360/133 |

*Primary Examiner*—John H. Wolff
*Attorney, Agent, or Firm*—Theodore J. Koss, Jr.

[57] ABSTRACT

A motor for direct or coaxial drive of a disc storage, mounted in a center hole formed in a storage disc includes a rotor and a stator which form together with an air gap separating the rotor from the stator a magnetic circuit. The stator has a single-phase winding. The motor produces an auxiliary reluctance moment complementing the electromagnetic torque produced by the winding and being offset in time relative to the electromagnetic torque. Due to the positioning of the motor within the center hole of the disc a very compact construction is obtained.

10 Claims, 5 Drawing Figures

DISK STORAGE DRIVE

CROSS-REFERENCE TO A RELATED APPLICATION

This application is a continuation-in-part of the application Ser. No. 127,404 filed Mar. 5, 1980, now abandoned.

BACKGROUND OF THE INVENTION

The present invention relates to brushless D.C. motors in general, and particularly to a disk storage drive equipped with a brushless D.C. motor.

In disk storage devices bits representing data are stored in circular tracks on rigid or flexible disks which are rotated at relatively high speeds. Bits are inscribed or read by a read/write head which must be accurately positioned relative to the particular track which is being inscribed or read. This means that the disks must rotate absolutely true, or as close to it as possible.

To impart rotation to such disks it is known to arrange the electric drive motor axially below the disk and to connect the disk via suitable connecting elements to the motor shaft for rotation therewith. This, however, is disadvantageous because the upper of the two motor-shaft bearings is subjected—not the least because of the high-speed rotation—to greater stresses than the lower one. As a result, the disk will soon no longer rotate true and reading and writing errors will develop.

According to another proposal the motor is located somewhat higher, so that the disk is positioned in a plane which is axially adjacent (i.e., as considered with reference to the axis of rotation) to the upper bearing of the motor. The connecting elements are shaped differently than in the first-mentioned construction, but they still connect the disk with the motor axis. This means that although the disadvantages of the first-mentioned construction are somewhat alleviated in this second proposal, they still do exist.

Still another proposal, contained in U.S. Pat. No. 4,101,945, provides for the connection of the disk to the motor shaft above the motor, but arranges the bearing system intermediate the disk and the motor.

Common to all this prior art is the connection of the disk to the motor shaft, which requires relatively complicated connecting structure without, however, being able to assure optimum uniformity of load distribution to all bearings of the motor-shaft bearing system.

SUMMARY OF THE INVENTION

Accordingly, it is an object of the invention to provide an improved disk storage drive wherein the connection between the disk (or disks) and the drive motor is simpler than in the prior art.

A further object is to provide such an improved drive which is considerably more compact than those heretofore proposed.

Another object is to provide such a drive in which the forces (load) acting during the operation of the drive are distributed as uniformly as possible to all bearings of the motor-shaft bearing system.

A concomitant object is to provide a drive of the type in question in which the escape of contaminant particles from the interior of the motor, is wholly or substantially precluded. This is important since such particles—e.g., lubricant, metal particles and the like—may cause operating difficulties and/or damage to the disks, heads and other sensitive elements located in the "clean-room" environment in which disk storages are generally operated.

An additional object is to reduce the "out-of-true" running of the disk or disks driven by the inventive drive.

These and other objects of the invention are attained by a motor for coaxial drive of a disc storage, a combination comprising at least one storage disc having a center hole and mounted to said motor, said motor being a collectorless d.c. motor having a stator and a rotor, said rotor including permanent magnetic means, said stator and said rotor forming a magnetic circuit, said stator having a single phase stator winding producing an alternating field and forming part of the magnetic resistance of said magnetic circuit so producing an auxiliary reluctance moment complementing the electromagnetic torque produced by said winding, an angular position detector, and means for connecting said winding to a d.c. current source in dependence upon signals received from said detector, the magnetic resistance in the stator-part of the magnetic circuit being variable in dependence upon the angular position of said rotor, and the auxiliary reluctance moment being offset in time relative to the electromagnetic torque produced.

By resorting to the invention a direct connection of the disk(s) to the rotating component of the motor is obtained, rather than to the motor shaft and, moreover, the need for connecting elements extending outwardly away from the motor shaft is eliminated. As a result, a very compact and rigid unit of drive motor and disk(s) is obtained. The center of gravity of the disk(s) is located between the two motor bearings, so that the disk oscillating tendency is substantially reduced; the disk(s) can therefore run truer than in the prior art and this eliminates the objectionable prior-art disadvantages.

Different types of motors may be used for the inventive drive. A currently preferred type is a collectorless D.C. motor of the type disclosed in U.S. Pat. Nos. 3,873,897 and 3,840,761 as well as in German Allowed application AS 2,225,442. Using a motor of this type and having e.g., a single-phase winding, it is possible to obtain a practically constant torque. This is possible in other motors only by using two separate windings which are electrically offset by 90° and through which usually pulses of opposite polarity must be fed. A motor of the type outlined above is thus substantially simpler and less expensive since multiple windings and their associated electronic controls are omitted. Moreover, this type of motor is of excellent operating quality and can be made more compact than other motors of similar ratings, so that the motor can be mounted within the center holes of the disks and the bearing system can be made sufficiently robust to assure a prolonged service life. In connection with this latter aspect it must be remembered that the disk hole diameter is standardized, so that overall smaller dimensions of the motor leave more room for larger bearings to be used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The drive of the invention comprises a collectorless D.C. motor according to U.S. Pat. No. 3,873,897. Except for the details which are necessary for understanding of the invention the arrangement of the present application is the same as disclosed in the U.S. Pat. No. 3,873,897 which is herein incorporated by reference in its entirety.

Figure 1:
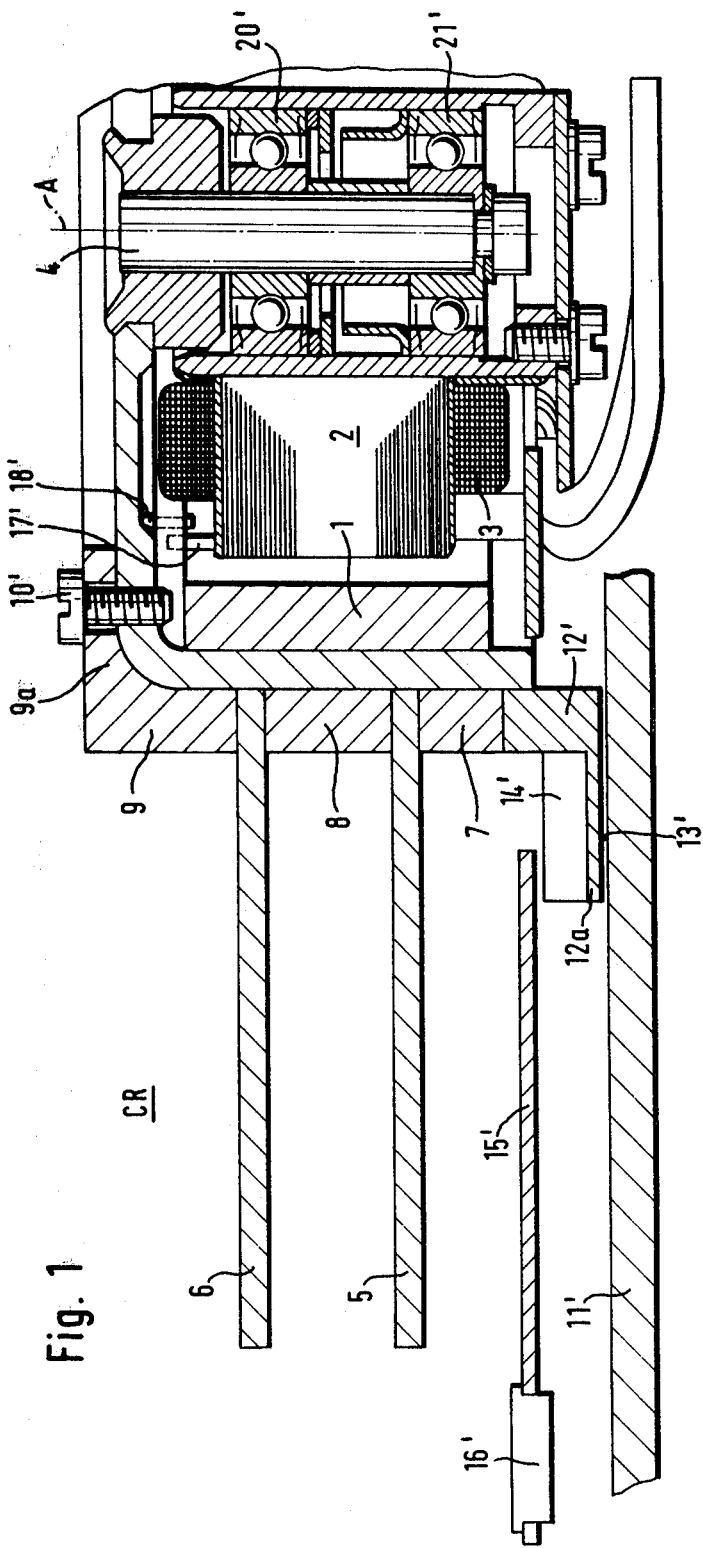
FIG. 1 is a fragmentary view, in vertical section, illustrating a first embodiment of the invention.
Figure 4:
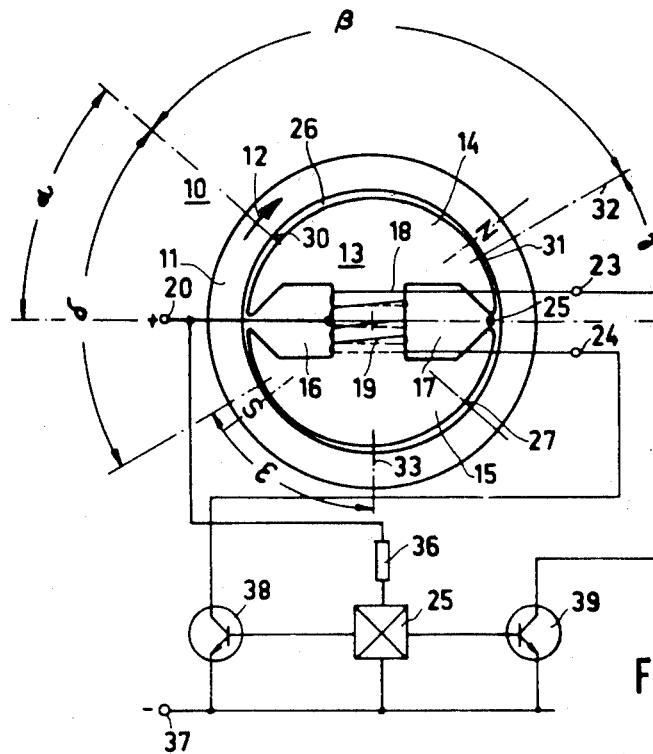
FIG. 4 is a schematic cross-sectional view of a two-pole external motor utilized in the drive according to the invention.

The motor is illustrated schematically in FIG. 4 of the drawing, which Figure shows a cross-sectional view of a two-pole external rotor motor which is utilized in a drive depicted in FIG. 1.

With reference to FIG. 4 showing the motor of the aforementioned U.S. patent, motor 10 has an outer permanent magnetic two-pole rotor 11, which is magnetized to have an approximately rectangular or trapez-shaped magnetic field distribution. In operation, the motor rotates in direction of arrow 12. Rotor 11 is shown in its quiescent or stop position, which is also its starting position, determined essentially by the geometry of the magnetic circuit.

Stator 13 of motor 10 is a salient pole double-T armature, having an upper pole 14 and a lower pole 15, both extended circumferentially over an extended arc or sector, covering almost an entire semi-circle. The armature is formed with two slots 16, 17 in which a single winding is placed formed of two winding halves 18, 19, with a center tap connected to positive terminal 20. The free ends of the winding halves 18, 19 are shown at terminals 23, 24. A Hall generator, or any equivalent galvanomagnetic commutation element or sensor is located at the edge of the slot 17, or at any electrically equivalent position of the stator 13.

The stator and rotor are separated by an air gap, having an air gap portion 26 above the pole 14 and the air gap portion 27 opposite pole 15. The width of the air gap is non-uniform in zones.

These zones define a zone of increasing width of the air gap and hence increasing reluctance of the magnetic circuit extending over one angular range to a maximum and a zone of decreasing width of the air gap and hence decreasing reluctance of the magnetic circuit extending over another angular range to a minimum.

Current in windings 18 and 19 is controlled, in dependence on the position of the pole of rotor 11, by an angular position detector which is Hall generator 25. Its control terminal is connected over a resistor 36 with positive terminal 20; its other terminal is connected to negative bus 37 of a direct current source, for example of 24 V. The two outputs of the Hall generator 25 are connected with the bases of a pair of npn transistors 38, 39, the emitter of which is connected to negative bus 37, whereas the collector of the transistor 38 connects with terminal 24 of the winding 19, and the collector of transistor 39 connects with the terminal 23 of winding 18. As the poles of rotor 11 pass the Hall generator 25, the one or the other transistor is gated to conduction during a predetermined angular range. The Hall generator 25 effects commutation, in the circuit of FIG. 4, between time periods 0°-el., 180°-el., 360°-el., etc. Current in one transistor (for example 38) is turned off when the current in the other transistor (e.g. 39) is turned on. The effective angle during which current flows in one of the two transistors, actually, is less than 180°-el, due to the commutation switching time, and is for example 160°-el. At the commutation instant, a small gap in torque will result.

With reference to FIG. 1, the motor has a permanent magnetic rotor 1 which surrounds a stator 2 (i.e., the motor is of the external-rotor type). Stator 2 has a one-phase winding 3 which produces an alternating field and an auxiliary reluctance moment which, in cooperation with the electromagnetic torque, produces a total torque of high constancy. As shown in FIG. 4(d) of U.S. Pat. No. 3,873,897, the reluctance torque component $M_{rel}$, at the regions marked "+", fills in the gaps in the electromagnetic-torque component $M_{el}$, and, additionally, prevents the rotor from coming to rest at angular positions at which the electromagnetic-torque component $M_{el}$, during subsequent start-up would be absent and incapable of effecting such start-up. Rotor 1 is journalled in stator 2 via a shaft 4 and a bearing system composed of two anti-friction bearings 20' and 21' which are spaced from one another axially of the shaft 4. The axis of rotation of the rotor 1 is designated with reference character A.

Mounted directly on the outer periphery of the rotor 1 (i.e., not on the shaft 4) are two disks 5, 6 of the disk storage (there could be a single disk or more than two). Mounting is effected via rings 7, 8 and 9 which surround the rotor 1; disks 5 and 6 are slipped over the rotor 1 (they have the usual center holes) and retained between the rings 6, 8 and the rings 8, 9, respectively. Ring 7 is secured in suitable manner (e.g., via screws, welds or the like) to the rotor 1; ring 9 has a flange portion 9a which overlaps the upper side of the rotor 1 and is secured thereto via a plurality of screws 10' (only one shown) which are spaced circumferentially about the axis A. Ring 9 presses against disk 6 and via the same presses ring 8 against disk 5 which in turn is pressed against ring 7; thus, disks 5 and 6 can rotate only with, but not relative to, the rotor 1.

In view of this direct connection of the disks 5, 6 to the rotor, and the position of the disks relative to the bearings in such a manner that the center of gravity of the rotor 1 is located between the two bearings 20', 21', forces are transmitted substantially uniformly to both bearings and the disks 5, 6 rotate true and without, or substantially without, any vibrations or oscillations.

Figure 5:
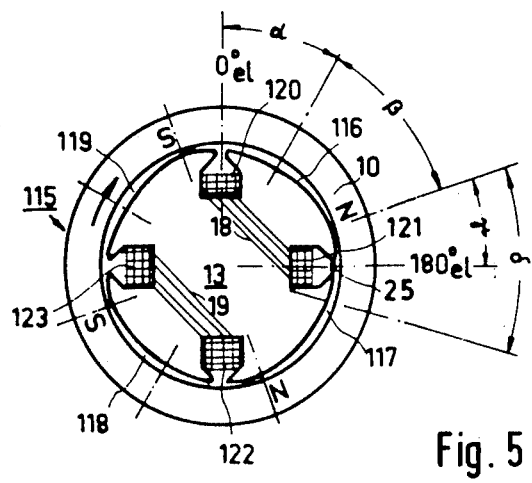
FIG. 5 is a schematic cross-sectional view of a four-pole external rotor motor which may be utilized in the drive according to the invention.

Brushless d.c. motor illustrated in FIG. 5 may be also used in the drive according to the invention. FIG. 5 shows a four-pole external rotor motor 115 having four air gaps 116, 117, 118, 119. Stator 13 (FIG. 4) has the approximate cross-sectional shape of a circle which is flattened at four, uniformly distributed positions along its circumference. In actual practice, these flattened regions can be rather small and are illustrated in the drawings exaggerated for better visibility. The four flattened areas are in the space between the slots 120 and 123. The position of Hall generator 25 is illustrated in FIG. 5, it may be located as shown, or at any gap of the stator poles, or at an electrically equivalent position.

As mentioned before, disk storages are most usually operated in "clean room" environments to protect them against contaminants. The drive according to the invention is particularly well adapted for such an application, because it can offer an anti-contaminant feature.

Motors, no matter how carefully manufactured, are inevitably a source of contaminant particles since lubricant, abraded metal particles and the like escape from the motor into the ambient atmosphere. In most applications this presents no problem, but it does do so under "cleanroom" conditions. Under such circumstances, therefore, the motor and disks may be mounted on a base plate or surface 11' constituting a part of the wall or walls which bound the "clean-room" environment CR. Such mounting is effected in any manner known per se and requires no illustration. Attached to the rotor 1 and/or the ring 7 (or else of one piece with either of these) is another ring 12' of generally L-shaped cross-section, having a portion 12a which extends parallel to the plate 11' and defines therewith a narrow gap 13' which communicates with the environment CR and with the air gap of the motor. The upper surface of portion 12a carries an annulus (one blade shown) of radially extending blades 14' which are arranged circumferentially of the ring 12'. An intermediate annular plate 15' is mounted above the plate 11', between the same and the lower disk 5; its radially inner edge portion overlaps but is upwardly spaced from the blades 14'. Plate 15' is provided with one or more openings (one shown) in which a filter 16' is installed. The airflow produced by the ring 12' and its blades 14' (acting as an impeller) causes a constant circulation of air through the filter 16', so that any contaminants released by the motor become entrapped in filter 16 and can do no harm in the environment CR.

Two overlapping annular baffles 17', 18' on the stator 2 and rotor 1 are interposed in the airgap between stator and rotor, defining with one another their own airgap which serves to further retard the escape of contaminants from the motor to the environment.

Figure 2:
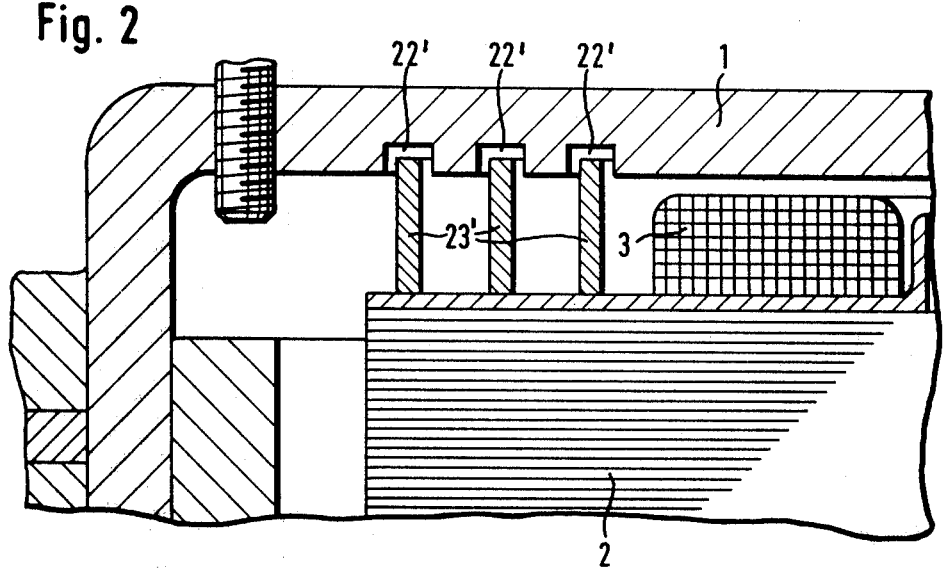
FIG. 2 is an enlarged fragmentary detail view, showing a modification of the embodiment in FIG. 1.

The embodiment of FIG. 2 is the same as the embodiment of FIG. 1, with the exceptions to be described, and therefore and illustration and discussion of the already familiar elements is not needed.

FIG. 2 differs from FIG. 1 in the more elaborate seal which replaces the baffles 17', 18'. This seal, arranged in the same location as the baffles in FIG. 1, is a labyrinth seal formed by a plurality of annular grooves 22' in the inner surface of rotor 1 into which a plurality of ribs 23' project from the stator 2. There is no contact of the ribs with the material bounding the grooves and the arrangement serves as a highly effective seal against the escape of contaminants to the motor. Incidentally, it goes without saying that although the seal is shown radially outwardly of the winding 3, it could be located radially inwardly of the same or it could be located both radially inwardly and radially outwardly to improve the effect still further.

Figure 3:
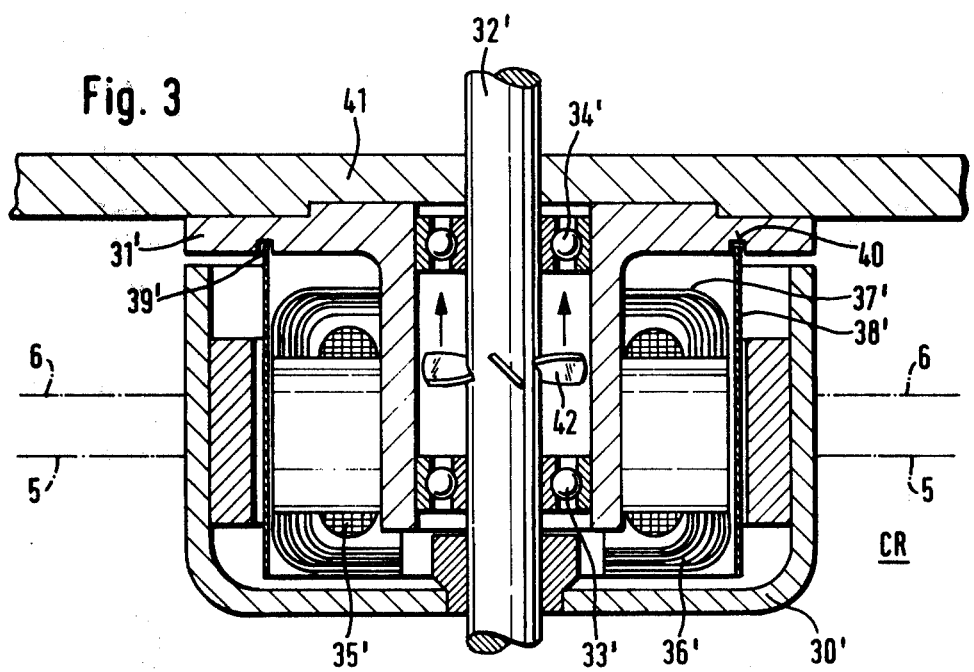
FIG. 3 is a view analogous to FIG. 1 but illustrating still another embodiment of the invention.

The embodiment of FIG. 3 is also particularly suited for "clean room" applications. Here, the rotor 30' is monted in stator 31' via shaft 32' and anti-friction bearings 33', 34". The winding 35' of stator 31' is heavily potted, i.e., embedded in one of the electrically insulating materials 36' which are known per se in the art, to prevent the escape of contaminant particles. The potting material 36' may in turn be surrounded by a jacket of heat-shrinkable synthetic plastic (also known per se) which, when shrunk onto the material 36', surrounds the same extremely tightly and further prevents the escape of contaminant particles. A cupped inverted cover 38' of electrically insulating material may surround the winding, being connected to the stator 31', and have an upper free circumferential edge 39' which extends into an annular groove 40 of the stator 31' to provide still another seal against the escape of contaminants. The groove 40 could be omitted and the edge 39' simply abut the stator 31'.

The disks 5 and 6 are shown only diagrammatically here; their mounting on rotor 30, although not shown, may be analogous to the showing in FIG. 1. Stator 31' is mounted beneath a supporting plate 41 and the "clean-room" environment CR is also below this plate.

Within the hub of the stator 31', intermediate the bearings 33', 34', the shaft 32' carries a set of blades 42 which, on rotation of shaft 32', cause an axial airflow in the direction indicated by the arrows. Thus, air is drawn from the environment CR through the bearing 33' and expelled via the bearing 34' and the opening in plate 41, into the non-controlled ambient atmosphere. Any contaminant particles which may be liberated in the path of this airflow—e.g., dust, abraded bearing metal particles—will be expelled from the motor to the ambient atmosphere and cannot enter the environment CR.

The invention is susceptible of a variety of modifications. For example, if desired a shielding element could be used to surround the rotor, being connected thereto for rotation with the same. The disks could then be mounted on this shielding element. The element connecting the upper end of shaft 4 to rotor 1 (see FIG. 1) could be constructed as a radial-flow impeller in lieu of or in addition to—and to perform the function of —the impeller 12', 14'. The drive according to the invention is suitable for use with all types of disk storages and irrespective of the diameter of the center hole of the disks. It is also conceivable to use an A.C. motor instead of a D.C. motor and to use an internal-rotor motor; only slight modifications would be necessasry in the latter case to mount the disks in the desired manner.

While the invention has been illustrated and described as embodied in a disk storage drive, it is not intended to be limited to the details shown, since various modifications and structural changes may be made without departing in any way from the spirit of the present invention. For example, ring 7 of FIG. 1 could be of one piece with rotor 1.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a digital information-storage apparatus of the type having a read and/or write head which inscribes information bits onto, and/or reads them from, at least one data storage disk which is rotated at high speed relative to such head by means of a rotary disk-holding structure configured to be accommodated in the large central aperture of such disk and transmit rotation thereto, the combination with said rotary disk-holding structure of a brushless d.c. reluctance-torque motor, said brushless d.c. reluctance-torque motor comprising
a stator,
a rotor,
said rotor being coupled to said rotary disk-holding structure to transmit rotation thereto,
said rotor being a permanent-magnet rotor,
said stator having a stator winding which when energized by d.c. current establishes a stator field which in cooperation with said rotor produces an electromagnetic-torque component having a magnitude which is a variable function of rotor angular position and which, at predetermined angular positions of said rotor, is of zero magnitude, and thus incapable of starting the rotor from said predetermined positions,
whereby if, when the motor is shut off, the rotor were to come to a complete stop in said predetermined positions, it could not thereafter be restarted by mere application of current to the stator winding,
said rotor and stator being separated from each other by an air gap and together forming a magnetic circuit whose reluctance is a function of the angular position of said rotor thereby producing a reluctance-torque component, the reluctance-torque component varying as a function of rotor angular position and having a magnitude which is of non-zero value at said predetermined rotor angular positions at which the electromagnetic-torque component is of zero value,
said non-zero value of said reluctance-torque component at said predetermined angular positions precluding the rotor from becoming stuck at said predetermined positions during start-up of the motor,
an angular position detector detecting the angular position of said rotor,
and means controlling flow of current through said stator winding in dependence upon the operation of said angular position detector to cause said stator field to alternate, in dependence upon rotor angular position, between two stator-field orientations which are 180 electrical degrees opposite to each other.

2. In an apparatus as defined in claim 1, said stator winding being so disposed, and the functional dependence of the reluctance-torque component on rotor angular position being such, that the reluctance-torque and electromagnetic-torque components combine, when the level of current flowing through the stator winding is of predetermined magnitude, to form a net torque which is more constant than either the reluctance-torque component alone or the electromagnetic-torque component alone.

3. In an apparatus as defined in claim 2, said reluctance-torque and electromagnetic-torque components combining, when the level of current flowing through the stator winding is of predetemined magnitude, to form a net torque which is substantially constant for all rotor angular positions.

4. In an apparatus as defined in claim 3, the stator winding being so disposed that the electromagnetic-torque component exists at first ranges of angular position of the rotor but does not exist at second ranges of angular position of the rotor, the functional dependence of the reluctance-torque component on rotor angular position being such that, in said second ranges, the reluctance-torque component has a predetermined value equal to the net torque of the motor at said second ranges, whereas at said first ranges the reluctance-torque component has a value which, in combination with that of said electromagnetic-torque component at said first ranges, yields a net torque likewise of said predetermined value, whereby the net torque is substantially constant at said predetermined value at both said first and said second ranges of rotor angular position.

5. In an apparatus as defined in claim 1, said stator winding being so disposed that the electromagnetic-torque component exhibits gaps at certain ranges of angular position of the rotor, the functional dependence of the reluctance-torque component on rotor angular position being such that the reluctance-torque component, at said ranges of rotor angular position, has a non-zero value serving to at least partly fill in the gaps of the electromagnetic-torque component.

6. In an apparatus as defined in claim 1, said brushless D.C. reluctance-torque motor being so located relative to said rotary disk-holding structure as to occupy the central aperture of an information-storage disk held by said rotary disk-holding structure.

7. In an apparatus as defined in claim 1, said brushless D.c. reluctance-torque motor being an external-rotor motor, said rotor having an outer circumferential wall, said rotary disk-holding structure being connected to and encircling said outer circumferential wall.

8. In an apparatus as defined in claim 1, further including two bearings journalling said rotor on said stator and being spaced from one another lengthwise of the axis of rotation of said rotor, said rotor and rotary disk-holding structure having a joint center of gravity which is intermediate said bearings.

9. In an apparatus as defined in claim 1, said brushless D.C. reluctance-torque motor being so located relative to said rotary disk-holding structure that said rotor is coaxial with said rotary disk-holding structure, said rotor and disk-holding structure being rigidly connected together.

10. In an apparatus as defined in claim 1, said electromagnetic-torque component being directed in a predetermined rotary direction, said reluctance-torque component, at rotor angular positions at which the electromagnetic-torque component is of zero value, being likewise directed in said predetermined rotary direction.

* * * * *